US011283884B2

(12) United States Patent
Mercadie et al.

(10) Patent No.: US 11,283,884 B2
(45) Date of Patent: Mar. 22, 2022

(54) METHODS FOR THE SHARING OF LOCATION DATA BETWEEN A SOURCE DEVICE OF A USER AND A THIRD PARTY'S DESTINATION DEVICE, CORRESPONDING SERVER, SOURCE DEVICE OF A USER, THIRD PARTY'S DESTINATION DEVICE, AND COMPUTER PROGRAM

(71) Applicant: Orange, Issy-les-Moulineaux (FR)

(72) Inventors: Philippe Mercadie, Chatillon (FR); Giovanni Battista Accetta, Chatillon (FR); Boris Pinatel, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 0 days.

(21) Appl. No.: 16/606,479

(22) PCT Filed: Apr. 17, 2018

(86) PCT No.: PCT/FR2018/050958
§ 371 (c)(1),
(2) Date: Oct. 18, 2019

(87) PCT Pub. No.: WO2018/193201
PCT Pub. Date: Oct. 25, 2018

(65) Prior Publication Data
US 2020/0280845 A1 Sep. 3, 2020

(30) Foreign Application Priority Data
Apr. 19, 2017 (FR) ........................................ 1753399

(51) Int. Cl.
*H04L 67/52* (2022.01)
*H04W 4/029* (2018.01)
(Continued)

(52) U.S. Cl.
CPC ............. *H04L 67/18* (2013.01); *H04W 4/029* (2018.02); *H04W 12/065* (2021.01);
(Continued)

(58) Field of Classification Search
CPC ....... H04W 4/029; H04W 4/02; H04W 4/025; H04W 4/33; H04W 12/00503;
(Continued)

(56) References Cited

U.S. PATENT DOCUMENTS 9,621,661 B2 * 4/2017 Diem ..................... G06Q 10/00
10,684,350 B2 * 6/2020 Dupray ................. G01S 5/0263
(Continued)

FOREIGN PATENT DOCUMENTS

EP      2621205 A1     7/2013

OTHER PUBLICATIONS

English translation of the International Written Opinion dated Jul. 11, 2018 for corresponding International Application No. PCT/FR2018/050958, filed Apr. 17, 2018.
(Continued)

*Primary Examiner* — Magdi Elhag
(74) *Attorney, Agent, or Firm* — David D. Brush; Westman, Champlin & Koehler, P.A.

(57) ABSTRACT

A method for managing sharing of data on location between a user's source device and at least one third party's destination device. The method includes receiving first identifiers of the user's source device and of the third party's destination device and an authorization message indicating whether the destination device is authorized to obtain data on location of the source device; building or updating a table of correspondence associating the first identifier of the source device with the first identifier of the destination device; receiving data on location of the user's source device; receiving a request for transmitting data on location of the
(Continued)

user's source device, corresponding to the first identifier of the user's source device, and a second identifier of the third party's destination device; and transmitting the data on location to the third party's destination device when the first and second identifiers of the third party's destination device correspond.

15 Claims, 2 Drawing Sheets

(51) Int. Cl.
    *H04W 12/065*     (2021.01)
    *H04W 12/084*     (2021.01)
    *H04W 12/104*     (2021.01)
    *H04W 12/63*     (2021.01)

(52) U.S. Cl.
    CPC ....... *H04W 12/084* (2021.01); *H04W 12/104* (2021.01); *H04W 12/63* (2021.01)

(58) Field of Classification Search
    CPC ....... H04W 12/1004; H04W 12/00514; H04W 12/0051; H04W 12/08; H04W 12/065; H04W 12/068; H04W 12/63; H04W 12/33; H04W 12/37; H04W 12/104; H04W 12/084; H04L 67/22; H04L 67/24; H04L 63/0876; H04L 67/18

See application file for complete search history.

(56) References Cited

U.S. PATENT DOCUMENTS

| | | | |
|---|---|---|---|
| 2007/0229350 A1* | 10/2007 | Scalisi | G08B 21/0247 |
| | | | 342/350 |
| 2009/0094351 A1 | 4/2009 | Gupta et al. | |
| 2010/0325194 A1* | 12/2010 | Williamson | H04L 63/107 |
| | | | 709/203 |
| 2014/0129942 A1* | 5/2014 | Rathod | H04N 21/44222 |
| | | | 715/720 |
| 2016/0309300 A1 | 10/2016 | Dong et al. | |
| 2017/0215031 A1* | 7/2017 | Harding | G01C 21/3415 |
| 2017/0295173 A1* | 10/2017 | Walsh | H04L 63/101 |
| 2018/0176221 A1* | 6/2018 | Zhou | H04L 63/0884 |
| 2020/0058039 A1* | 2/2020 | Russo | G06Q 10/00 |

OTHER PUBLICATIONS

International Search Report dated Jul. 3, 2018 for corresponding International Application No. PCT/FR2018/050958, filed Apr. 17, 2018.

* cited by examiner

METHODS FOR THE SHARING OF LOCATION DATA BETWEEN A SOURCE DEVICE OF A USER AND A THIRD PARTY'S DESTINATION DEVICE, CORRESPONDING SERVER, SOURCE DEVICE OF A USER, THIRD PARTY'S DESTINATION DEVICE, AND COMPUTER PROGRAM

CROSS-REFERENCE TO RELATED APPLICATIONS

This application is a Section 371 National Stage Application of International Application No. PCT/FR2018/050958, filed Apr. 17, 2018, the content of which is incorporated herein by reference in its entirety, and published as WO 2018/193201 on Oct. 25, 2018, not in English.

1. FIELD OF THE INVENTION

The field of the invention is that of geolocation.

More specifically, the present invention offers a solution for the sharing of location data, enabling especially a third party's destination device, authorized by a user's source device, to access data on location of the user's source device.

For example, the user's source device is a connected watch communicating with a third party's destination device such as a smartphone implementing an application dedicated to the sharing of location data.

The present invention can be applied especially in all fields requiring the geolocation of an individual, for example in the field of sports.

2. PRIOR ART

In sports, there are known ways of using watches equipped with a geolocation module. Such watches can thus be used to determine the user's position and the time needed to complete his route and are therefore used by sportsperson to know and possibly improve their performance.

One drawback of these watches is that they do not allow any sharing of positions with a third party. Thus, during a marathon for example, the runner's family cannot track the position of the runner in real time.

There is therefore a need for a novel solution for sharing location data that does not have this prior art drawback.

3. SUMMARY OF THE INVENTION

According to a first aspect, a method is proposed for managing the sharing of location data between a user's source device and at least one third party's destination device, the method comprising:
  the receiving of a first identifier of the user's source device, a first identifier of the third party's destination device and an authorization message indicating whether the third party's destination device is authorized to obtain data on location of the user's source device, transmitted by the user's source device,
  the building or updating of a table of correspondence associating the first identifier of the user's source device with the first identifier of the third party's destination device,
  the receiving of data on location of the user's source device,
  the receiving, from the third party's destination device, of a request for transmitting data on location of the user's source device, the request comprising a second identifier of the user's source device corresponding to the first identifier of the user's source device and a second identifier of the third party's destination device,
  the determining, by using the second identifier of the user's source device and the table of correspondence, of whether the first and second identifiers of the third party's destination device correspond, and
  the transmission of the data on location of the user's source device to the third party's destination device, in response to the request, when the first and second identifiers of the third party's destination device correspond.

Such a method according to this embodiment, implemented for example in a remote server of the user's source device and of the third party's destination device, makes it possible to manage the authorization of access to the data on location of the user's source device.

For example, the user of the user's source device can select those amongst his contacts to whom he authorizes access to his location data. In the same way, the user of the user's source device can select those amongst his contacts to whom he does not authorize or no longer authorizes access to his location data. For each of the selected contacts, a first identifier of the third party's destination device, associated with this contact, such as his telephone number, is transmitted to the server which can thus manage a table of correspondence between a first identifier of the user's source device and the first identifier of the third party's destination device associated with each selected contact. In particular, the server can add or remove the first identifier of the user's destination device from tables of correspondence, depending on whether or not it is authorized by the user of the user's source device to access his location data.

The method according to this embodiment therefore enables the user of the user's source device to temporarily authorize the users of the destination devices to access their geolocation information.

When the third party's destination device wishes to access the data on location of the user's source device, it sends a request for transmission of data on location of the user's source device to the server, the request comprising a second identifier of the user's source device, corresponding to the first identifier of the user's source device, and a second identifier of the third party's destination device. If the first identifier and the second identifier of the third party's destination device correspond (for example if they are identical or correlated), and therefore if the first identifier of the third party's destination device is associated with the first identifier of the user's source device in the table of correspondence, the server can transmit the data on location of the user's source device to the third party's destination device.

For example, the first and second identifiers of the user's source device are a telephone number associated with a user's source device and the first and second identifiers of the third party's destination device are a telephone number associated with the third party's destination device. According to one particular embodiment, the method for managing also comprises the receiving of a duration of validity applicable to the data on location of the user's source device.

Such a duration of validity especially makes it possible to define a time of storage, on the server, of the data on location of the user's source device.

For example, the method for managing comprises:
  the activation of a timeout having a value equal to the duration of validity, the storage in memory of the data on location of the user's source device, which are to be transmitted to the third party' destination device, during the timeout, the elimination of the location data stored after expiry of the timeout.

According to this example, the data on location of the user's source device can be stored temporarily on the server, during a time defined by the duration of validity, and then eliminated by the server.

It is thus ensured that the data on location of the user's source device will not be preserved and subsequently exploited for purposes not envisaged or not authorized. In other words, no timeline or chronology of the location data is preserved.

According to another aspect, a server is proposed to manage the sharing of location data between a user's source device and at least one third party's destination device, comprising a processor coupled operationally with a memory and configured to:

receive, from the user's source device, a first identifier of the user's source device, a first identifier of the third party's destination device and an authorization message indicating whether the third party's destination device is authorized to obtain data on location of the user's source device, build or update a table of correspondence associating the first identifier of the user's source device with the first identifier of the third party's destination device, receive data on location of the user's source device, receive, from the third party's destination device, a request for transmission of data on location of the user's source device, the request comprising a second identifier of the user's source device, corresponding to the first identifier of the user's source device, and a second identifier of the third party's destination device, determine, by using the second identifier of the user's source device and a table of correspondence, whether the first and second identifiers of the third party's destination device correspond, and transmit the data on location of the user's source device to the third party's destination device in response to the request, when the first and second identifiers of the third party's destination device correspond.

Such a server is especially adapted to implementing the method for managing the sharing of location data described here above.

Such a server could of course comprise the different characteristics pertaining to the proposed method for managing which can be combined or taken in isolation. Thus, the characteristics and advantages of this server are the same as those of the method for managing.

Such a server can especially be adapted to exchanging data with the user's source device and the third party's destination device.

For example, such a server is managed by a telecommunications operator, the processor being configured to communicate with the source and destination devices by transmission/reception of data in the operator's network.

According to a second aspect, a method is proposed for sharing location data between a user's source device and at least one third party's destination device, implemented in the user's source device, comprising:

the selection of a first identifier of the third party's destination device from amongst a set of identifiers of destination devices stored in the user's source device, the transmission, to a remote server, of a first identifier of the user's source device, the first identifier of the third party's destination device and a message of authorization indicating whether the third party's destination device is authorized to obtain location data on the user's source device, the transmission, to the third party's destination device, of a second identifier of the user's source device, corresponding to the first identifier of the user's source device, and of an access information message informing it if it is authorized to obtain data on location of the user's source device, and the transmission, to the remote server, of the data on location of the user's source device.

Such a method according to this embodiment also makes it possible to manage the authorization of access to data on location of the user's source device. In particular, it makes it possible to define the destination devices authorized or not authorized to access data on location of the user's source device, and to inform the server and the destination devices accordingly.

Such a method of sharing is advantageously well suited to the exchange of data with a remote server implementing the method described here above for managing the sharing of location data.

This method of sharing can of course comprise the different characteristics pertaining to the proposed method for managing which can be combined or taken in isolation. Thus, the characteristics and advantages of this method of sharing are the same as those of the method for managing.

According to one particular embodiment, the method of sharing also comprises the transmission, to the remote server, of a duration of validity applicable to the data on location of the user's source device.

As indicated here above, a duration of validity such as this makes it possible especially to define a time of storage of the data on location of the user's source device on the server.

In particular, the duration of validity can be preliminarily configured and stored in a memory of the user's source device. For example, such a piece of information can be entered by the user of the user's source device, by means of a user interface.

According to another particular embodiment, the access information message (transmitted from the user's source device to the third party's destination device) comprises a dynamic link, configured to open a dedicated application if it is installed on the third party's destination device or, if not, to propose that the third party's destination device should download the dedicated application.

The implementation of the sharing of location data between users is thus simplified.

According to one particular embodiment, the access information message and the authorization message indicate that the third party's destination device is authorized to obtain data on location of the user's source device or, conversely, that the third party's destination device is not authorized to obtain data on location of the user's source device.

According to another aspect, a user's source device is proposed, configured to share location data with at least one third party's destination device comprising a processor operationally coupled with a memory, and configured to:

select a first identifier of the third party's destination device from amongst a set of destination device identifiers stored in the user's source device, transmit, to a remote server, a first identifier of the user's source device, a first identifier of the third party's destination device and an authorization message indicating whether the third party's destination device is authorized to obtain data on location of the user's source device, transmit, to the third party's destination device, a second identifier of the user's source device, corresponding to the first identifier of the user's source device, and an access information message informing it that it is authorized to obtain location data of the user's source device, and transmit location data of the user's source device to the remote server.

Such a user's source device is especially adapted to implementing the method for sharing location data described here above.

This user's source device could of course comprise the different characteristics pertaining to the proposed method of sharing, which can be combined or taken in isolation. Thus, the characteristics and advantages of this device are the same as those of the sharing method.

For example, such a device is a watch, furthermore comprising:

a geolocation module,
a communications module.

Such a watch thus has available communications means, for example cell communications means, enabling it to communicate with the remote server and with destination devices.

According to a third aspect, there is proposed a method of access to data on location of a user's source device, implemented in a third party's destination device, comprising:

the receiving, from the user's source device, of an identifier of the user's source device, called a second identifier of the user's source device, and an access information message informing the third party's destination device if it is authorized to obtain data on location of the user's source device, the transmission, to a remote server, of a request for transmission of data on location of the user's source device, the request comprising the second identifier of the user's source device and an identifier of the third party's destination device, called a second identifier of the third party's destination device, and the receiving, from the server, of the data on location of the user's source device, in response to the request for transmission of data on location of the user's source device.

In particular, the second identifier of the user's source device corresponds to the first identifier of the user's source device, transmitted by the user's source device to the server.

Such a method according to this embodiment enables a third party's destination device to access the data on location of the user's source device, if it is authorized.

In particular, it enables requests for data on location of the user's source device to be sent to the server. For example, at each request, or periodically, the server verifies whether the third party's destination device is authorized to access the data on location of the user's source device. If such is the case, the server sends it the data on location of the user's source device.

This method of access could of course include the different characteristics pertaining to the proposed methods of management and sharing, which can be combined or taken in isolation. Thus, the characteristics and advantages of this method of access are the same as those of the method for managing and sharing.

According to another aspect, there is proposed a third party's destination device configured to access data on location of a user's source device, this third party's destination device comprising a processor coupled operationally with a memory, and configured to:

receive, from the user's source device, an identifier of the user's source device, called a second identifier of the user's source device, and an access information message informing the third party's destination device whether it is authorized to obtain data on location of the user's source device, transmit, to a remote server, a request for transmission of data on location of the user's source device, the request comprising the second identifier of the user's source device and an identifier of the third party's destination device, called a second identifier of the third party's destination device, and receive, from the server, data on location of the user's source device in response to the request for transmission of data on location of the user's source device.

Such a third party's destination device is especially suited to implementing the method of access to location data described here above.

This user's source device could of course comprise the different characteristics pertaining to the proposed method of access, which can be combined with one another or taken in isolation. Thus, the characteristics and advantages of this device are the same as those of the method of access.

For example, such a device is a user apparatus such as a personal computer, a smartphone, a tablet etc., comprising a communications module configured to communicate at least with the remote server.

Such a device thus has communications means, for example cell means, enabling it to communicate with the remote server and with the user's source device.

Another aspect relates to one or more computer programs comprising instructions for implementing the method for managing the sharing of location data and/or a method for sharing location data and/or a method of access to location data as described here above when this program or these programs are executed by at least one processor.

According to yet another aspect, one or more computer-readable, non-transient recording media are proposed, comprising instructions of one or more computer programs comprising instructions for the implementing of a method to manage the sharing of location data and/or a method for sharing location data and/or a method of access to location data as described here above.

4. LIST OF FIGURES

Other features and advantages of the invention shall appear more clearly from the following description of one particular embodiment, given by way of a simple illustratory and non-exhaustive example, and from appended figures, of which.

5. DESCRIPTION OF ONE EMBODIMENT

The proposed solution enables a user to share his position with authorized third parties.

Figure 1:
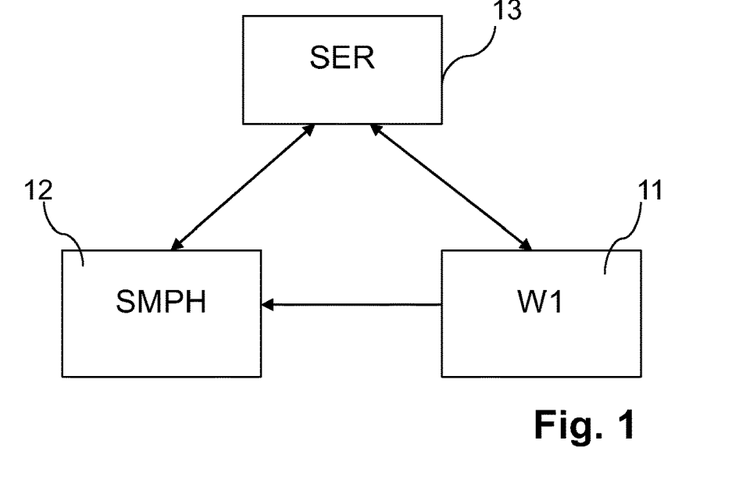
FIG. 1 presents different devices proposed for the sharing of location data according to one embodiment.

According to one particular embodiment, the sharing of location data is implemented between a user's source device and one or more destination devices through at least one remote server. As illustrated in FIG. 1, the user's source device 11 wishes to share location data with one or more destination devices 12 through a remote server 13.

For example, the user's source device 11 is a watch W1 of a user A, the third party's destination device 12 is a smartphone SMPH of a user B, and the server 13 is a server SER hosted by a telecommunications operator and capable of communicating with other nodes of the operator's infrastructure. The watch W1 comprises a communications module to communicate with the server SER by means of a programming interface (an API or Applications Programming Interface), in particular to transmit location data to the server. The smartphone SMPH is adapted to implementing an application dedicated to the sharing of location data, also called a companion application. The server SER is capable of communicating with the companion application when it is executed by the smartphone SMPH by means of a specific applications programming interface (API) specific to the companion application. The smartphone SMPH thus executes a companion application of the watch W1, which comprises a user interface capable of displaying data on the screen, related to the location of the watch W1 and received from the server SER.

More generally, the user's source device comprises, inter alia, a geolocation module making it possible especially to obtain data on location of the user's source device, a communications module, for example of the cell type, making it possible especially to transmit location data to a server and to transmit an access information message to a third party's destination device, a memory being used for example to store identifiers of the destination devices (contacts of the user of the user's source device), and a processor. The user's source device can especially be equipped with a subscriber identity module SIM (in the form of a SIM card, a SIM module adjoined to the device or integrated into it (eSIM module or embedded SIM)), conventionally used in mobile telephony to store information specific to the subscriber of a mobile network. It can therefore be associated with a telephone number by means of the SIM unit. The geolocation module receives for example location data from the U. S. Global Positioning System (GPS) or the European Galileo System. It can also receive or update location data from one or more sensors, for example of the accelerometer or gyrometer type.

Such a third party's destination device can therefore be a smartphone, a tablet or any other connected device (tags for animals, geolocation for bicycles etc.).

In the same way, more generally, the third-party destination device comprises, inter alia, a communications module, for example of a cell type, making it possible especially to receive location data from a server and receive an access information message from a source device of the user, a memory and a processor. The third party's destination device can especially be equipped with a SIM card. It is especially configured to execute the companion application dedicated to the sharing of location data.

Such a destination device can therefore be a smartphone, a tablet or any other connected device.

Here below, referring to FIG. 2, we describe an example of implementation of the methods according to one or more embodiments. For example, the method for sharing location data is deemed to be implemented in a user's source device of the watch W1 type, that the method for managing the sharing of location data is implemented in a server SER and that the method of access to the location data is implemented in a third party's destination device of the smartphone SMPH type as described here above.

We consider for example a list of contacts stored in a memory of the watch W1. Each contact (corresponding for example to the name of a person) has an associated first identifier (corresponding for example to a telephone number of this person), also called a first identifier of the third party's destination device, or first subscriber identifier.

A first identifier of the third party's destination device IDd1 is selected (111) from amongst all of the destination device identifiers stored in the watch W1, corresponding for example to the smartphone SMPH. This selection can be made by the user of the watch W1 through a user interface. In other words, the user of the watch W1 selects a contact from the list of contacts (or equivalently a first identifier of the third party's destination device from amongst all the destination device identifiers) to identify a person (equivalently a third party's destination device) to whom the user of the watch W1 wishes to open his geolocation, i.e. with whom or with which the user of the watch W1 wishes to share his location data.

The watch W1 sends (112) the remote server SER:
- a first identifier of the watch also called a first identifier of the user's source device (IDs1), corresponding for example to a telephone number of the user of the watch (such as the telephone number associated with the SIM unit of the watch W1 should it be integrated with a SIM unit as described here above),
- the first identifier of the third party's destination device (IDd1), et
- an authorization message (message A) stating that this third party's destination device is authorized to obtain location data for the watch W1.

According to one particular embodiment, the authorization message carries the first identifier of the user's source device and/or the first identifier of the third party's destination device.

The server SER therefore receives (131) the following from the user's source device: a first identifier of the user's source device (IDs1), the first identifier of the third party's destination device (IDd1) and the authorization message (message A).

On receiving this information, the server SER builds or updates (132) a table of correspondence (of the LUT type for example) associating the first identifier of the user's source device with the first identifier of the third party's destination device. Depending on the content of the authorization message, the first identifier of the third party's destination device can be added to the list of destination devices authorized to receive data on location of the watch W1 in the table of correspondence, or it can be eliminated from the list. As a variant, the first identifier of the third party's destination device can be associated with a code in the table of correspondence, indicating that it is authorized or not authorized to receive data on location of the watch W1. For example, in the table of correspondence or in another table, the first identifier of the third party's destination device IDd1 is associated with a value '0' if it is not authorized to receive data on location of the watch W1 or with a value '1' if it is authorized to receive location data.

According to this embodiment, it is thus possible, from a list of contacts or identifiers of destination devices, to determine the persons (or destination devices) with whom or with which the user of the user's source device wishes to begin sharing his location data or, conversely, the persons (or destination devices) with whom or with which the user of the user's source device no longer wishes to share his location data.

The watch W1 also transmits (113) the following to the smartphone SMPH associated with a first identifier of the third party's destination device (IDd1):
- a second identifier of the watch, also called a second identifier of the user's source device (IDs2), corresponding to the first identifier of the user's source device (IDs1), for example a telephone number of the user of the watch,
- an access information message (message IA) informing the smartphone SMPH whether it is authorized to obtain data on location of the watch W1.

According to one particular embodiment, the access information message carries the second identifier of the user's source device.

The smartphone SMPH therefore receives (121) the following from the user's source device: a second identifier of the user's source device (IDs2) and the access information message (message IA). According to this embodiment, to be able to access the data on location of the watch W1, the user of the smartphone SMPH or, equivalently, the first identifier of the third party's destination device associated with the smartphone SMPH, must therefore be in the list of contacts of the user of the watch W1 stored in the watch W1 or, equivalently, among the identifiers of the destination devices stored in the watch W1.

For example, this access information message is transmitted in the form of an SMS, an email message etc. Such an access information message can, according to one particular embodiment, additionally carry a dynamic link, configured to open the dedicated companion application if this application is installed in the third party's destination device or, if not, to propose the downloading of the dedicated companion application to the third party's destination device.

In other words, according to this example, the dynamic link carried by the access information message works as follows:
- if the companion application dedicated to the sharing of data on location is not installed in the third party's destination device having the access information message (smartphone SMPH), the link redirects it towards an application distribution platform and more specifically towards the companion application page so that it downloads it;
- if the companion application dedicated to the sharing of location data is installed on the third party's destination device having the access information message, the link makes it possible to directly open the application from which it can receive and display the data on location of the user's source device that are shared with this third party's destination device.

According to one particular embodiment, since the watch W1 has directly contacted the third party's destination device by the sending of an access information message, the watch W1 appears in the user interface of the companion application, in the list of "visible source devices", i.e. the source devices for which the third party's destination device can request access to location data. The companion application can thus be updated with the watch W1.

At the end of these operations, the watch W1 and the smartphone SMPH can be considered to be paired.

When the user of the smartphone SMPH wishes to access the data on location of the watch W1, it transmits (122) a request to the server SER, through a user interface, for transmission of data on location of the watch W1. Such a request sent out by the smartphone SMPH comprises an identifier of the smartphone SMPH or of the companion application, called a second identifier of the third party's destination device (IDd2). For example, such an identifier is the telephone number of the smartphone SMPH, the name of the user of the smartphone SMPH etc. In one or more embodiments, the request sent out by the smartphone SMPH additionally comprises an identifier of the user's source device, in the example considered an identifier of the watch W1, called a second identifier of the user's source device (IDs2). For example, such a second identifier is the identifier of the watch W1 from which the smartphone SMPH has received the access information message, for example a telephone number of the watch W1.

The server SER receives (133) the request for transmission of data on location of the watch W1 sent out by the third party's destination device and comprising the second identifier of the third party's destination device as well as the second identifier of the user's source device.

Since the second identifier of the user's source device corresponds to the first identifier of the user's source device used to build or update a table of correspondence associating the first identifier of the user's source device with the first identifier of the third party's destination device, the server can use the second identifier of the user's source device and the table of correspondence to determine whether the first and second identifiers of the third party's destination device correspond.

For example, on the basis of the second identifier of the user's source device, the server SER analyses (134), on the one hand, the first identifier of the third party's destination device stored in the table of correspondence if the third party's destination device is authorized to receive data on location of the user's source device or associated with a code indicating whether it is authorized to receive data on location of the user's source device. On the other hand it analyses the second identifier of the third party's destination device.

If the first identifier of the third party's destination device and a second identifier of the third party's destination device correspond, for example if they are identical or if they are associated with the same person, it means that the third party's destination device, i.e. the smartphone SMPH, is authorized to receive data on location of the user's source device, i.e. the watch W1.

The watch W1 can therefore transmit (114) its location data to the server SER, either continuously or upon a request from the server. For example, an application embedded in the watch W1 retrieves the position of the watch W1 by interrogating a geolocation module of the watch W1, and then transmits this data to the server SER so that the user of the watch W1 can temporarily share his geolocation with the user of the third party's smartphone SMPH. In one or more embodiments, the watch W1 can be configured to send the server its location data once it has sent out an access information message authorizing access to its location data to at least one third party's destination device.

According to one particular embodiment, the location data are sent to the server SER with a piece of information such as duration of validity (val) of the location data. For example, the watch W1 sends a message to the server SER comprising the data on location of the watch W1 as well as a duration of validity of these data.

According to this particular embodiment, the duration of validity is a parameter that can be stored in the watch W1 and configured by the user of the watch W1. For example the duration of validity can be chosen to be equal to a value ranging from one hour to one week.

The server SER can thus receive (135) the data on location of the watch W1, either continuously or in response to a request from the server.

As the case may be, according to the particular embodiment presented here above, the data on location of the watch W1 can be associated with a piece of information such as duration of validity. According to this particular embodiment, upon reception of the data on location of the watch W1, the server SER activates a timeout, the value of which is equal to the duration of validity received with the location data.

The server SER can then transmit (136) the data on location of the watch W1 to the smartphone SMPH if the first and second identifiers of the third party's destination device correspond.

The server SER then consults for example the table of correspondence associating a first identifier of the watch W1 with the first identifier of each destination device of the third party authorized by the user of the watch W1 to receive data on location of the watch W1, and transmits this location data to this or to these third party's destination devices.

According to the particular embodiment presented here above, the server SER can transmit the data on location of the watch W1 to the smartphone SMPH during the timeout. After the expiry of the timeout, corresponding to the end of the duration of the validity of the location data, the server SER erases these location data and retains no trace of them whatsoever. It is no longer possible to transmit these data to the third party's destination device.

The smartphone SMPH can thus receive (123) the data on location of the watch W1 from the server, and the user of the smartphone SMPH can view the location, for example the geolocation co-ordinates, of the watch W1.

Figure 2:
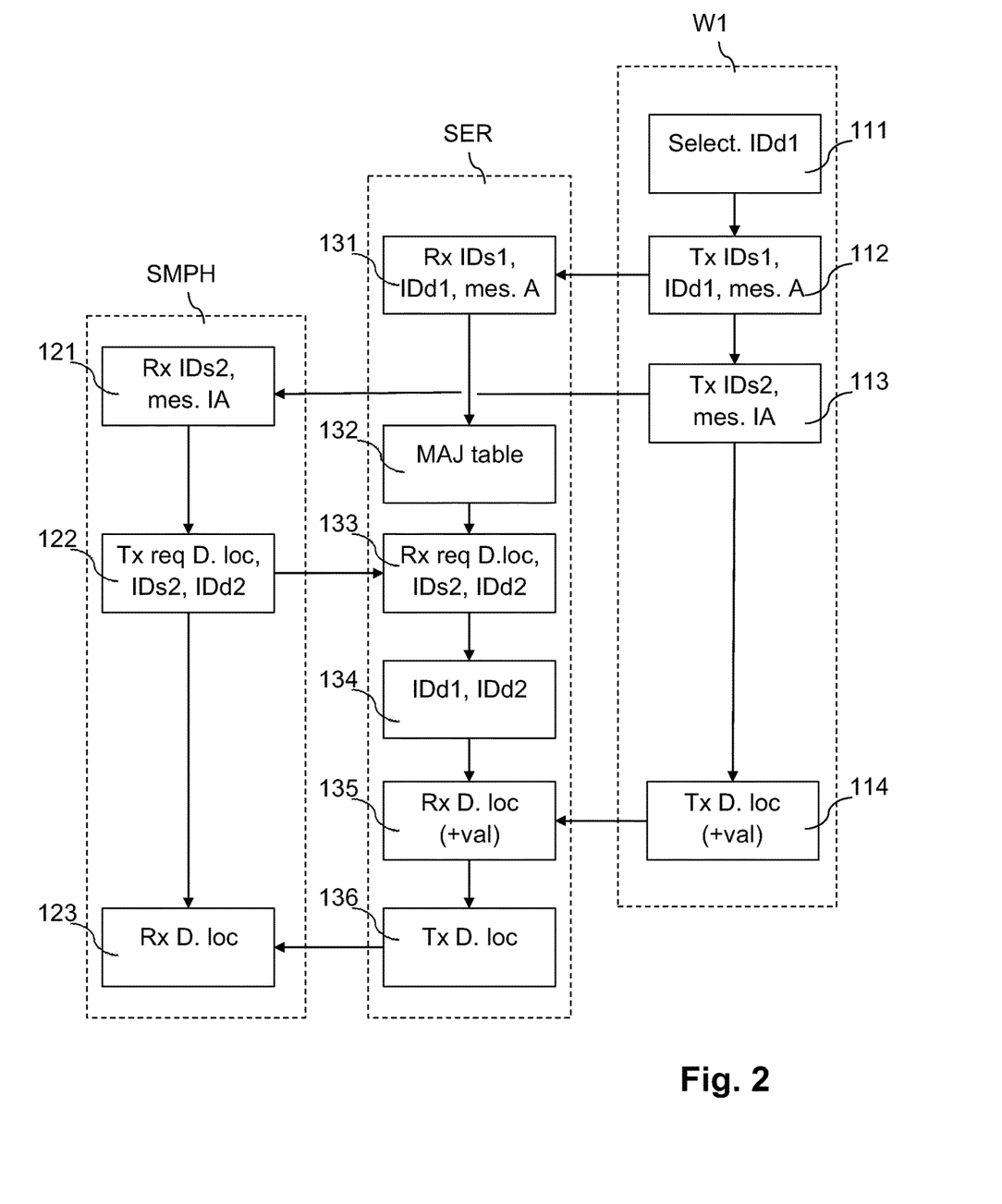
FIG. 2 illustrates the different methods proposed for the sharing of location data according to one embodiment.

A simplified description has been provided, with reference to FIGS. 1 and 2, of the implementation of the proposed methods in a source device of the user, a server and a third party's destination device. Naturally, several source devices, several servers and/or several destination devices can be implemented. In this case, the operations described here above are implemented for each of the user's source devices, each server and/or each third party's destination device considered.

For example, if we consider several source devices, the server or the servers manage one or more tables of correspondence, associating, for each source device of the user, a first identifier of the user's source device with the first identifiers of the destination devices authorized by the user's source device considered. The server or servers can therefore manage a plurality of source devices and a plurality of destination devices.

Depending on the embodiment, the identifier of the user's source device transmitted to the server (first identifier of the user's source device) and to the destination devices (second identifier of the user's source device) could take different forms such as for example an email address or a telephone number associated with the user's source device and/or with this user.

If a third party's destination device is authorized to receive location data from several source devices, it can display, in the user interface of the companion application, the list of "visible" source devices, i.e. the source devices for which the third party's destination device can request access to the location data.

If several destination devices are considered then, for each source device of the user, the server or servers transmit the data on location of the user's source device considered to the companion application being executed on each destination device of the third party that is authorized by the user's source device considered.

According to the embodiments presented here above, the user of the user's source device can therefore choose the person to whom he sends his location data. He can especially authorize the user of a third party's destination device to access his location data only for a specific time period (for example the time of a race or a run). In addition, the user's source device does not transmit its location data to the authorized destination devices through the server permanently but does so only on request from a third party's destination device after verification by the server that the third party's destination device is still allowed to receive location data from the user's source device.

It can be noted that the operations mentioned here above can be implemented in a different order. For example, the transmission of the access information message I to the smartphone SMPH can be implemented before the transmission to the server of the first identifier of the third party's destination device and of the message A. In the same way, the transmission of the data on location of the watch W1 to the server can be implemented continuously, or solely upon request from the server. The comparison of the first identifier of the third party's destination device and of the second identifier of the third party's destination device can be implemented before or after the reception, by the server, of the location data.

It can also be noted that, in order to secure the data exchanges, the messages exchanged between the server and the third party's destination device (via the dedicated companion application dedicated to the sharing of location data) can be exchanged according to the HTTPS (HyperText Transfer Protocol Secure) secure communications protocol.

In particular, in order to secure the data exchanges between the server and the third party's destination device, a phase for recording the application with the server can be implemented. For example, the user of the companion application dedicated to the sharing of location data can create a user account with the server. During this creation of an account, the application transmits, to the server, an identifier of the third party's destination device configured to execute the application, also called a second identifier of the third party's destination device, corresponding for example to the telephone number of the user of the third party's destination device. The server in response transmits a message to the third party's destination device (for example an SMS type message addressed to the telephone number). This message comprises especially an authentication code. This authentication code makes it possible to verify that the person using the third party's destination device is effectively authorized, because this person must enter the authentication code received into the companion application. Then, all the exchanges between the third party's destination device and the server, via the application, are done by using an authentication header formed by a token comprising the second identifier of the third party's destination device and the received authentication code.

In the operating phase, the application sends "REST" type HTTPS requests to the server, using the token. In particular, the application sends the server a request for transmission of data on location of the user's source device to receive the location data that it can access.

On receiving a request for transmission of data on location of the user's source device sent out by the application, the server extracts the second identifier of the third party's destination device from the request (for example, a telephone number), then compares it with the first identifiers of destination devices that it has received from the user's source device, stored in a table of correspondence. If the second identifier of the third party's destination device corresponds to a first identifier of the third party's destination device, the server verifies, in the table of correspondence, whether this third party destination device is allowed to access the data on location of the user's source device. In other words, the server looks into the tables of correspondence to find out which are the source devices for which the second identifier of the third party destination device (for example a telephone number) has access to their location data. The server makes this verification on the basis of the first identifier of the third party's destination device (for example a telephone number) which it has received from the user's source device.

If the third party's destination device is authorized to access the data on location of the user's source device, the server transmits the data on location to the third party's destination device.

It can be noted that a similar protocol can also be implemented to secure the data exchanges between the server and the user's source device.

Figure 3:
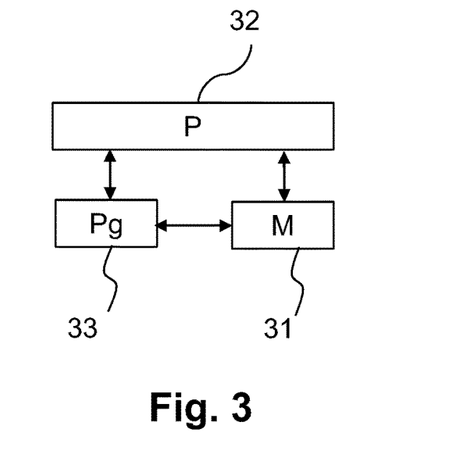
FIGS. 3 to 5 respectively illustrate the simplified structure of a user's source device, a third party's destination device and a server according to one particular embodiment for the implementation of the proposed methods.
Figure 4:
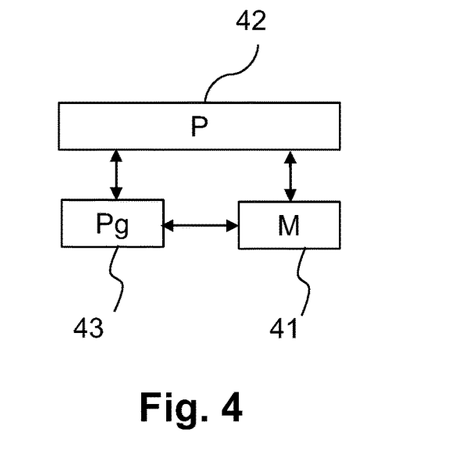
Figure 5:
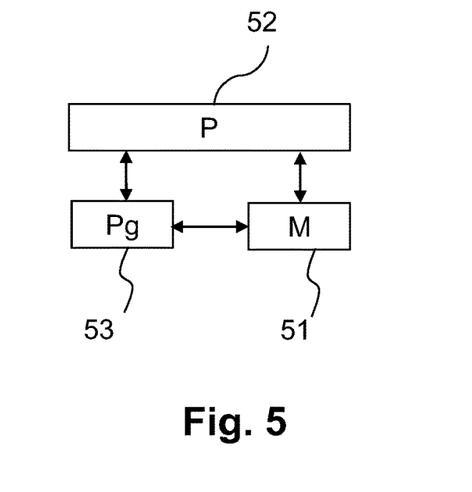

Referring to FIGS. 3 to 5 respectively, we present the structure of a user's source device, a third party destination device and a server, according to one embodiment. Only the main elements pertaining to the implementing of the proposed technique are illustrated.

As illustrated in FIG. 3, the user's source device comprises a memory 31, a processing unit 32 equipped for example with a processor P and driven by an application or a computer program 33 configured to implement one or more embodiments of the proposed method for sharing location data.

At initialization, the code instructions of the computer program 33 are for example loaded into a RAM memory and then executed by the processor of the processing unit 32. The processor of the processing unit 32 is configured to implement the method for sharing location data according to at least one embodiment, according to the instructions of the computer program 33, in order to select a first identifier of the third party's destination device from amongst a set of destination device identifiers stored in the user's source device, transmit to a remote server a first identifier of the user's source device, the first identifier of the third party's destination device and an authorization message indicating whether this third party's destination device is authorized to obtain data on location of the user's source device, transmit to the third party's destination device a second identifier of the user's source device, corresponding to the first identifier of the user's source device, and an access information message informing it whether it is authorized to obtain data on location of the user's source device, and transmit data on location of the user's source device to the remote server.

The user's source device can be a watch, a geolocation tag, an electronic component or another apparatus comprising a geolocation module, a communications module and a processor operationally coupled with a memory as well as, according to the chosen embodiment, other associated hardware elements such as a network interface and a medium reader to read a detachable storage medium and write to such a medium (not shown in the figure). The detachable storage medium can for example be a compact disk (CD), a digital versatile disk/digital video disk (DVD), a flash drive, a USB stick etc. Depending on the embodiment, the detachable memory or storage medium contains instructions which, when they are executed by the processing unit 32, lead this processing unit 32 to select destination devices authorized to receive location data and/or exchange data with the server and/or a third party's destination device according to at least one mode of implementation of the proposed method for sharing location data.

In addition, the proposed method for sharing location data can be implemented in software form, as described here above, in which case it takes the form of a program executed by a processor, or in hardware form such as an applications-specific integrated circuit (ASIC), a system-on-chip (SOC) or in the form of a combination of hardware and software elements, such as for example a software program intended to be loaded and executed on a field programmable gate array (FPGA) type of component. The SOCs are embedded systems that integrate all the components of an electronic system in a single chip. An ASIC is a specialized electronic circuit that groups functions customized for a given application. The ASICs are generally configured during manufacture and can only be simulated by the user. The FPGAs are electronic circuits that can be reconfigured by the user.

A method for sharing location data as proposed can also use hybrid architectures such as for example architectures based on CPU+FPGA, a GPU (Graphics Processing Unit) or an MPPA (Multi-Purpose Processor Array).

As illustrated in FIG. 4, the third party's destination device comprises a memory 41, a processing unit 42 equipped for example with a processor P and driven by an application, especially the companion application dedicated to the sharing of location data, or a computer program 43 configured for the implementing of one or more embodiments of the proposed method for sharing location data.

At initialization, the code instructions of the computer program 43 are for example loaded into a RAM memory and then executed by the processor of the processing unit 42. The processor of the processing unit 42 is configured to implement the method of access to location data according to at least one embodiment, according to the instructions of the computer program 43 to receive a second identifier of the user's source device and an access information message informing the third party's destination device as to whether it is authorized to obtain data on location of the user's source device, transmit a request to a remote server for the transmission of data on location of the user's source device, the request comprising a second identifier of the third party's destination device, and receive data on location of the user's source device from the server in response to the request.

The third party's destination device can be a portable telephone, for example a smartphone, a computer, an electronic component or any other apparatus comprising a communications module and a processor coupled operationally with a memory as well as, according to the chosen embodiment, other associated hardware elements such as a network interface and a support medium to read a detachable storage medium and write to such a medium (not shown in the figure). The detachable storage medium can for example be a compact disk (CD), a digital versatile disk/digital video disk (DVD), a flash drive, a USB stick etc. Depending on the embodiment, the memory or the detachable storage medium contains instructions which, when executed by the processing unit 42, lead this processing unit 42 to exchange data with the server and/or the user's source device according to at least one mode of implementation of the proposed method of access to location data.

In addition, the proposed method of access to location data can be implemented in software form as described here above, in which case it takes the form of a program executable by a processor, or in hardware form as in an applications-specific integrated circuit (ASIC), a system-on-chip (SOC) or in the form of a combination of hardware and software elements such as for example a software program intended to be loaded and executed on an FPGA type component. A method of access to the location data as proposed can also use hybrid architectures such as for example architectures based on a CPU+FPGA, a GPU or an MPPA.

As illustrated in FIG. 5, the server comprises a memory 51, a processing unit 52 equipped for example with a processor P and driven by an application or a computer program 53, configured to implement one or more embodiments of the proposed method to manage the sharing of location data.

At initialization, the code instructions of the computer program 53 are for example loaded into a RAM memory and then executed by the processor of the processing unit 52. The processor of the processing unit 52 is configured to implement the method to manage the sharing of location data sharing according to at least one embodiment according to the instructions of the computer program 53 to receive, from the user's source device, a first identifier of the user's source device, a first identifier of the third party's destination device and an authorization message indicating whether the third party's destination device is authorized to obtain data on location of the user's source device, build or update a table of correspondence associating the first identifier of the user's source device with the first identifier of the third party's destination device, receive data on location of the user's source device, receive a request for the transmission of data on location of the user's source device, the request comprising a second identifier of the user's source device, corresponding to the first identifier of the user's source device, and a second identifier of the third party's destination device, determine, from the second identifier of the user's source device and the table of correspondence, whether the first and second identifiers of the third party's destination device correspond, and transmit the data on location of the user's source device to the third party's destination device, in response to the request, when the first and second identifiers of the third party's destination device correspond.

The server can be a computer or an network of computers or any other apparatus comprising a processor coupled operationally to a memory, as well as, according to the chosen embodiment, other associated hardware elements such as a network interface and a medium reader to read a detachable storage medium and write to such a medium (not shown in the figure). The detachable storage medium can be, for example, a compact disk (CD), a digital versatile disk/digital video disk (DVD), a flash drive, a USB stick etc. Depending on the embodiment, the memory or the detachable storage medium contains instructions which, when they are executed by the processing unit 52, lead this processing unit 52 to exchange data with the user's source device and/or the third party's destination device according to at least one mode of implementation of the proposed method for managing the sharing of location data.

In addition, the proposed method for sharing location data can be implemented in software form as described here above, in which case it takes the form of a program executable by a processor, or in hardware form as an applications-specific integrated circuit (ASIC), a system-on-chip (SOC) or the form of a combination of hardware and software elements such as for example a software program intended to be loaded and executed on an FPGA type component. A method to manage the sharing of location data as proposed can also use hybrid architectures such as for example architectures based on a CPU+FPGA, a GPU or an MPPA.

Depending on the chosen embodiment, certain acts, actions, events or functions of each of the methods described in the present document can be carried out or can occur in an order different from the one in which they have been described, or they can be added, merged or else not be performed or else not occur, as the case may be. In addition, in certain embodiments, certain acts, actions or events are carried out or occur concurrently and not in succession.

Although described through a certain number of detailed exemplary embodiments, the proposed methods and the corresponding devices comprise different variants, modifications and improvements that will be clearly apparent to those skilled in the art, it being understood that these different variants, modifications and improvements are within the scope of the invention, as defined by the following claims. In addition, different aspects and characteristics described here above can be implemented together or separately or else substituted for one another and all these different combinations and sub-combinations of the aspects and characteristics are part of the scope of the invention. In addition, it can be the case that certain devices described here above do not incorporate the totality of the modules and functions described for the preferred embodiments.

An exemplary embodiment of the present disclosure proposes a solution for sharing location data enabling third parties authorized by the user to access the user's location data.

An exemplary embodiment proposes a solution enabling the user to temporarily allow third parties to access his or her geolocation information.

An exemplary embodiment proposes a solution enabling the temporary storage of location data.

Although the present disclosure has been described with reference to one or more examples, workers skilled in the art will recognize that changes may be made in form and detail without departing from the scope of the disclosure and/or the appended claims.

The invention claimed is:

1. A method for managing sharing of data on location between a user's source device and at least one third party's destination device, the method comprising the following acts implemented in a server:
   receiving, from the user's source device, a first identifier of the user's source device, a first identifier of the third party's destination device and an authorization message indicating whether the third party's destination device is authorized to obtain data on location of the user's source device,
   building or updating a table of correspondence associating the first identifier of the user's source device with the first identifier of the third party's destination device,
   receiving data on location of the user's source device,
   receiving from a companion application dedicated to the sharing of location data and being executed by the third party's destination device, a second identifier of the third party's destination device, the second identifier of the third party's destination device being configured to execute the companion application, transmitting to the third party's destination device, a message comprising an authentication code to be entered in the companion application, receiving, from the third party's destination device, a request for transmitting data on location of the user's source device, the request comprising the second identifier of the third party's destination device and a second identifier of the user's source device corresponding to an identifier of the user's source device from which the third party's destination device has received an access information message, said access information message informing the third party's destination device if the third party's destination device is authorized to obtain data on location of the user's source device, determining, by using the second identifier of the user's source device and the table of correspondence, whether the first and second identifiers of the third party's destination device correspond, said determining comprising, on the basis of the second identifier of the user's device source received, analyzing the first identifier of the third party's destination device stored in the table of correspondence if the third party's destination device is authorized to receive data on location of the user's source device, and the second identifier of the third party's destination device received, and transmitting the data on location of the user's source device to the third party's destination device, in response to the request, when it is determined that the first and second identifiers of the third party's destination device correspond, wherein once the authentication code is entered in the companion application, the receiving, from the third party's destination device, the request for transmitting data on location of the user's source device, and the transmitting the data on location of the user's source device to the third party's destination device are done by using an authentication header formed by a token comprising the second identifier of the third party's destination device and the authentication code.

2. The method for managing according to claim 1, also comprising receiving a duration of validity applicable to the data on location of the user's source device.

3. The method for managing according to claim 2, further comprising:
   activation of a timeout having a value equal to the duration of validity,
   storage in memory of the data on location of the user's source device during the timeout,
   elimination of the stored location data stored after expiry of the timeout.

4. The method for managing according to claim 1, wherein the second identifier of the third party's destination device comprised in the request is received from the companion application dedicated to the sharing of location data and executed by the third party's destination device.

5. The method for managing according to claim 1, wherein, by using a dynamic link carried by the access information message, the companion application is opened if the companion application is installed in the third party's destination device or, if not, the downloading of the companion application is proposed to the third party's destination device.

6. The method for managing according to claim 1, wherein the first identifier of the third party's destination device is associated with a code in the table of correspondence, said code indicating whether the third party's destination device is authorized or not authorized to received data on location of the user's source device.

7. A server to manage the sharing of location data between a user's source device and at least one third party's destination device, comprising:
   a processor coupled operationally with a memory and configured to:
   receive, from the user's source device, a first identifier of the user's source device, a first identifier of the third party's destination device and an authorization message indicating whether the third party's destination device is authorized to obtain data on location of the user's source device,
   build or update a table of correspondence associating the first identifier of the user's source device with the first identifier of the third party's destination device,
   receive data on location of the user's source device,
   receive from a companion application dedicated to the sharing of location data and being executed by the third party's destination device, a second identifier of the third party's destination device, the second identifier of the third party's destination device being configured to execute the companion application,
   transmit to the third party's destination device, a message comprising an authentication code to be entered in the companion application,
   receive, from the third party's destination device, a request for transmitting data on location of the user's source device, the request comprising the second identifier of the third party's destination device and a second identifier of the user's source device corresponding to an identifier of the user's source device from which the third party's destination device has received an access information message, said access information message informing the third party's destination device if the third party's destination device is authorized to obtain data on location of the user's source device,
   determine, by using the second identifier of the user's source device and the table of correspondence, whether the first and second identifiers of the third party's destination device correspond, said determining comprising, on the basis of the second identifier of the user's device source received, analyzing the first identifier of the third party's destination device stored in the table of correspondence if the third party's destination device is authorized to receive data on location of the user's source device, and the second identifier of the third party's destination device received, and
   transmit the data on location of the user's source device to the third party's destination device, in response to the request, when it is determined that the first and second identifiers of the third party's destination device correspond,
   wherein once the authentication code is entered in the companion application, the receiving, from the third party's destination device, the request for transmitting data on location of the user's source device, and the transmitting the data on location of the user's source device to the third party's destination device are done by using an authentication header formed by a token comprising the second identifier of the third party's destination device and the authentication code.

8. A user's source device configured to share location data with at least one third party's destination device, the user's source device comprising:
- a processor operationally coupled with a memory, and configured to
- select a first identifier of the at least one third party's destination device from amongst a set of identifiers of destination devices stored in the user's source device,
- transmit, to a remote server, a first identifier of the user's source device, the first identifier of the at least one third party's destination device and a message of authorization indicating whether the at least third party's destination device is authorized to obtain data on location of the user's source device,
- transmit directly, to the at least third party's destination device, a second identifier of the user's source device, corresponding to the first identifier of the user's source device, and an access information message informing the third party's destination device if the third party's destination device is authorized to obtain data on location of the user's source device, the second identifier of the user's source device being used by the remote server to determine whether the first and second identifiers of the third party's destination device correspond, and
- transmit, to the remote server, the data on location of the user's source device once the user's source device has transmitted an access information message authorizing access to the user's source device's location data to at least one third party's destination device.

9. The user's source device according to claim 8, the processor being further configured to transmit, to the remote server, a duration of validity applicable to the data on location of the user's source device.

10. The user's source device according to claim 9, wherein the duration of validity is preliminarily configured and stored in a memory of the user's source device.

11. The user's source device according to claim 8, wherein the access information message and the authorization message indicate that the third party's destination device is authorized to obtain data on location of the user's source device.

12. The user's source device according to claim 8, wherein the access information message and the authorization message indicate that the third party's destination device is not authorized to obtain data on location of the user's source device.

13. The user's source device according to claim 8, wherein the user's source device is a watch, the watch furthermore comprising:
- a geolocation device,
- a communications device.

14. A third party's destination device configured to access data on location of a user's source device, the third party's destination device comprising:
- a processor coupled operationally with a memory, and configured to
- receive, from the user's source device, an identifier of the user's source device, called a second identifier of the user's source device, and an access information message informing the third party's destination device if the third party's destination device is authorized to obtain data on location of the user's source device,
- transmit, to a remote server, via a companion application dedicated to the sharing of location data and being, an identifier of the third party's destination device, called a second identifier of the third party's destination device, the second identifier of the third party's destination device being configured to execute the companion application,
- receive, from the remote server, a message comprising an authentication code;
- enter the authentication code in the companion application,
- transmit, to a remote server, a request for transmission of data on location of the user's source device, the request comprising the second identifier of the user's source device and the second identifier of the third party's destination device, the second identifier of the user's source device corresponding to an identifier of the user's source device from which the third party's destination device has received the access information message, and
- receive, from the server, the data on location of the user's source device, in response to the request for transmission of location data on the user's source device,
- wherein once the authentication code is entered in the companion application, the transmitting, to the remote server, the request for transmitting data on location of the user's source device, and the receiving, from the server, the data on location of the user's source device to the third party's destination device are done by using an authentication header formed by a token comprising the second identifier of the third party's destination device and the authentication code.

15. A non-transitory computer-readable medium comprising instructions stored thereon, which when executed by a processor of a user's source device, configure the user's source device to manage sharing of data on location between the user's source device and at least one third party's destination device by performing acts comprising:
- selecting a first identifier of the at least one third party's destination device from amongst a set of identifiers of destination devices stored in the user's source device,
- transmitting, to a remote server, a first identifier of the user's source device, the first identifier of the at least one third party's destination device and a message of authorization indicating whether the at least one third party's destination device is authorized to obtain data on location of the user's source device,
- transmitting, to the at least one third party's destination device, a second identifier of the user's source device, corresponding to the first identifier of the user's source device, and an access information message informing the at least one third party's destination device if the at least one third party's destination device is authorized to obtain data on location of the user's source device, the second identifier of the user's source device being used by the remote server to determine whether the first and second identifiers of the third party's destination device correspond, and
- transmitting, to the remote server, the data on location of the user's source device once the user's source device has transmitted an access information message authorizing access to the user's source device's location data to at least one third party's destination device.

* * * * *